US012066560B2

(12) United States Patent
Zhou et al.

(10) Patent No.: US 12,066,560 B2
(45) Date of Patent: Aug. 20, 2024

(54) NR POSITIONING ENHANCEMENT FOR TIMING AND ANGLE BASED METHODS AND RESOURCE AGGREGATION

(71) Applicant: Samsung Electronics Co., Ltd., Suwon-si (KR)

(72) Inventors: Yuhan Zhou, San Diego, CA (US); Philippe Sartori, Naperville, IL (US); Jung Hyun Bae, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 407 days.

(21) Appl. No.: 17/570,286

(22) Filed: Jan. 6, 2022

(65) Prior Publication Data
US 2022/0252690 A1 Aug. 11, 2022

Related U.S. Application Data

(60) Provisional application No. 63/171,426, filed on Apr. 6, 2021, provisional application No. 63/160,337, filed on Mar. 12, 2021, provisional application No. 63/147,844, filed on Feb. 10, 2021.

(51) Int. Cl.
G01S 5/02 (2010.01)
(52) U.S. Cl.
CPC ......... *G01S 5/0244* (2020.05); *G01S 5/021* (2013.01)
(58) Field of Classification Search
CPC ...... G01S 5/0244; G01S 5/021; G01S 5/0063; G01S 5/00; G01S 5/02; G01S 1/025; G01S 5/0036; G01S 1/02; H04W 56/004; H04W 24/10; H04W 24/00; H04W 64/006; H04W 64/00; H04W 24/08; H04W 56/0075; H04W 56/0065; H04W 56/00; H04W 24/02; H04W 24/04; H04W 56/008; H04W 56/0095; H04W 56/0055; H04W 36/0058; H04B 17/27; H04B 17/364
See application file for complete search history.

(56) References Cited

U.S. PATENT DOCUMENTS

| 10,623,909 | B2 | 4/2020 | Sosnin et al. |
| 11,206,632 | B2 | 12/2021 | Qi |
| 2004/0012874 | A1* | 1/2004 | Chainer et al. ................. 360/51 |
| 2010/0296438 | A1* | 11/2010 | Yu et al. ...................... 370/328 |

(Continued)

OTHER PUBLICATIONS (WO 2011099825 A2) >>> Apparatus and Method for Establishing Uplink Synchronization in a Wireless Communication System (see title) (Year: 2011).*

(Continued)

*Primary Examiner* — Meless N Zewdu
(74) *Attorney, Agent, or Firm* — Lewis Roca Rothgerber Christie LLP

(57) ABSTRACT

A method may include generating a receive timing error group (Rx TEG) based on a time delay of a receive (Rx) signal, wherein the time delay is a time measured from an arrival of the Rx signal at a Rx antenna to a time of the Rx signal being digitized and time-stamped at a baseband processor of a user equipment (UE), determining a timing error group (TEG) index corresponding to the generated Rx TEG, determining a positioning measurement associated with the Rx antenna used to generate the Rx TEG, and reporting the positioning measurement associated with the Rx TEG index.

23 Claims, 12 Drawing Sheets

(56) References Cited

U.S. PATENT DOCUMENTS

2011/0235762 A1* 9/2011 Cochran ............... 375/354
2020/0221485 A1* 7/2020 Cirik et al. ....... H04W 72/1289
2021/0051622 A1 2/2021 Manolakos et al.
2021/0337377 A1 10/2021 Manolakos et al.
2021/0377698 A1 12/2021 Manolakos et al.

OTHER PUBLICATIONS (CN 114765853 A) >>> Information Indicating Method, Device, Terminal Device, Network Device And Storage Medium (see title) (Year: 2022).*
European Search Report for EP Application No. 22155594.9 dated Jun. 9, 2022, 11 pages.
Moderator (CATT), "FL Summary #5 for accuracy improvements by mitigating UE Rx/Tx and/or gNB Rx/Tx timing delays", 3GPP TSG RAN WGi Meeting #104-e, Jan. 25-Feb. 5, 2021, URL:https://ftp.3gpp.org/tsg_ran/WG1_RL1/TSGR1_104-e/Docs/RI-2102204.zip RI-2102204 FL Summary for mitigating RxTx timing delays.docx, retrieved Feb. 8, 2021, 88 pages.
Samsung, "Discussion on accuracy improvements on timing based positioning solutions", 3GPP TSG RAN WGi Meeting #104-e, Jan. 25-Feb. 5, 2021, URL:https://ftp.3gpp.org/tsg_ran/WG1_RL1/TSGR1_104-e/Docs/RI-2101210.zip RI-2101210 Discussion on accuracy improvements on timing based positioning solutions.docx, retrieved on Jan. 19, 2021, 4 pages.

* cited by examiner

| Timing error (TE) contained in the measurement | TEG Index |
|---|---|
| TE < 3.3 ns | 0 |
| 3.3 ns ≤ TE < 5 ns | 1 |
| 5 ns ≤ TE < 10 ns | 2 |
| TE ≥ 10 ns | 3 |

FIG. 2

```
-- ASN1START

NR-DL-TDOA-SignalMeasurementInformation-r16 ::= SEQUENCE {
    dl-PRS-ReferenceInfo-r16        DL-PRS-ID-Info-r16,
    nr-DL-TDOA-MeasList-r16         NR-DL-TDOA-MeasList-r16,
    ...
}

NR-DL-TDOA-MeasList-r16 ::= SEQUENCE (SIZE(1..nrMaxTRPs-r16)) OF NR-DL-TDOA-MeasElement-r16

NR-DL-TDOA-MeasElement-r16 ::= SEQUENCE {
    dl-PRS-ID-r16                   INTEGER (0..255),
    nr-PhysCellID-r16               NR-PhysCellID-r16             OPTIONAL,
    nr-CellGlobalID-r16             NCGI-r15                      OPTIONAL,
    nr-ARFCN-r16                    ARFCN-ValueNR-r15             OPTIONAL,
    nr-DL-PRS-ResourceID-r16        NR-DL-PRS-ResourceID-r16      OPTIONAL,
    nr-DL-PRS-ResourceSetID-r16     NR-DL-PRS-ResourceSetID-r16   OPTIONAL,
    nr-TimeStamp-r16                NR-TimeStamp-r16,
    nr-RSTD-r16                     CHOICE {
        k0-r16                          INTEGER (0..1970049),
        k1-r16                          INTEGER (0..985025),
        k2-r16                          INTEGER (0..492513),
        k3-r16                          INTEGER (0..246257),
        k4-r16                          INTEGER (0..123129),
        k5-r16                          INTEGER (0..61565),
        ...
    },
    nr-AdditionalPathList-r16       NR-AdditionalPathList-r16     OPTIONAL,
    nr-TimingQuality-r16            NR-TimingQuality-r16,
    nr-DL-PRS-RSRP-Result-r16       INTEGER (0..126)              OPTIONAL,
    nr-DL-TDOA-AdditionalMeasurements-r16
                                    NR-DL-TDOA-AdditionalMeasurements-r16  OPTIONAL,
    ...
}

NR-DL-TDOA-AdditionalMeasurements-r16 ::= SEQUENCE (SIZE (1..3)) OF
                                    NR-DL-TDOA-AdditionalMeasurementElement-r16

NR-DL-TDOA-AdditionalMeasurementElement-r16 ::= SEQUENCE {
    nr-DL-PRS-ResourceID-r16        NR-DL-PRS-ResourceID-r16      OPTIONAL,
    nr-DL-PRS-ResourceSetID-r16     NR-DL-PRS-ResourceSetID-r16   OPTIONAL,
    nr-TimeStamp-r16                NR-TimeStamp-r16,
    nr-RSTD-ResultDiff-r16          CHOICE {
        k0-r16                          INTEGER (0..8191),
        k1-r16                          INTEGER (0..4095),
        k2-r16                          INTEGER (0..2047),
        k3-r16                          INTEGER (0..1023),
        k4-r16                          INTEGER (0..511),
        k5-r16                          INTEGER (0..255),
        ...
    },
    nr-TimingQuality-r16            NR-TimingQuality-r16,
    nr-DL-PRS-RSRP-ResultDiff-r16   INTEGER (0..61)               OPTIONAL,
    nr-AdditionalPathList-r16       NR-AdditionalPathList-r16     OPTIONAL,
    ...
}

-- ASN1STOP
```

FIG. 3

```
-- ASN1START

NR-DL-AoD-SignalMeasurementInformation-r16 ::= SEQUENCE {
    nr-DL-AoD-MeasList-r16         NR-DL-AoD-MeasList-r16,
    ...
}

NR-DL-AoD-MeasList-r16 ::= SEQUENCE (SIZE(1..nrMaxTRPs-r16)) OF NR-DL-AoD-
MeasElement-r16

NR-DL-AoD-MeasElement-r16 ::= SEQUENCE {
    dl-PRS-ID-r16                  INTEGER (0..255),
    nr-PhysCellID-r16              NR-PhysCellID-r16                 OPTIONAL,
    nr-CellGlobalID-r16            NCGI-r15
    OPTIONAL,
    nr-ARFCN-r16                   ARFCN-ValueNR-r15                 OPTIONAL,
    nr-DL-PRS-ResourceID-r16       NR-DL-PRS-ResourceID-r16          OPTIONAL,
    nr-DL-PRS-ResourceSetID-r16    NR-DL-PRS-ResourceSetID-r16
    OPTIONAL,
    nr-TimeStamp-r16               NR-TimeStamp-r16,
    nr-DL-PRS-RSRP-Result-r16      INTEGER (0..126),
    nr-DL-PRS-RxBeamIndex-r16      INTEGER (1..8)                    OPTIONAL, -
- Cond SameRx
    nr-DL-AoD-AdditionalMeasurements-r16
                                   NR-DL-AoD-AdditionalMeasurements-r16
    OPTIONAL,
    ...
}

NR-DL-AoD-AdditionalMeasurements-r16 ::= SEQUENCE (SIZE (1..7)) OF
                                         NR-DL-AoD-
AdditionalMeasurementElement-r16

NR-DL-AoD-AdditionalMeasurementElement-r16 ::= SEQUENCE {
    nr-DL-PRS-ResourceID-r16       NR-DL-PRS-ResourceID-r16          OPTIONAL,
    nr-DL-PRS-ResourceSetID-r16    NR-DL-PRS-ResourceSetID-r16
    OPTIONAL,
    nr-TimeStamp-r16               NR-TimeStamp-r16,
    nr-DL-PRS-RSRP-ResultDiff-r16  INTEGER (0..30),
    nr-DL-PRS-RxBeamIndex-r16      INTEGER (1..8)                    OPTIONAL, -
- Cond SameRx
    ...
}

-- ASN1STOP
```

FIG. 4

NR POSITIONING ENHANCEMENT FOR TIMING AND ANGLE BASED METHODS AND RESOURCE AGGREGATION

CROSS REFERENCE TO RELATED APPLICATION

This application claims priority to and the benefit of U.S. Provisional Application No. 63/147,844, filed Feb. 10, 2021; U.S. Provisional Application No. 63/160,337, filed Mar. 12, 2021; and U.S. Provisional Application No. 63/171,426, filed Apr. 6, 2021, which are incorporated herein by reference in their entirety.

FIELD

The present application generally relates to NR positioning enhancement for timing and angle based methods and resource aggregation.

BACKGROUND

In certain mobile communication networks (e.g., 5G networks), a position or location of a user equipment (UE) may be determined by location determination techniques (e.g., NR positioning). As technology advances, more accurate location of the UE is demanded. Accordingly, there is a need for techniques to improve location determination accuracies.

SUMMARY

According to an embodiment of the present disclosure, a method includes generating a receive timing error group (Rx TEG) based on a time delay of a receive (Rx) signal, wherein the time delay is a time measured from an arrival of the Rx signal at a Rx antenna to a time of the Rx signal being digitized and time-stamped at a baseband processor of a user equipment (UE), determining a timing error group (TEG) index corresponding to the generated Rx TEG, determining a positioning measurement associated with the Rx antenna used to generate the Rx TEG, and reporting the positioning measurement associated with the Rx TEG index.

The Rx TEG may be further based on one or more reported UE capabilities.

The positioning measurement may include a reference signal time difference (RSTD) measurement.

The RSTD measurement may be based on a position reference signal (PRS) resource associated with the Rx TEG.

The RSTD measurement may include a plurality of RSTD measurements based on a PRS resource of a transmission and reception point (TRP) with another Rx TEG corresponding to a different UE.

The method may further include pre-calibrating the time delay and compensating for the time delay based on the pre-calibrating.

The method may further include receiving a request from a Location Measurement Function (LMF) to report the Rx TEG index.

The UE may be configured to operate as a UE-assisted positioning device, and wherein the reporting the positioning measurement includes reporting to an LMF at a location server.

The UE may be configured to operate as a UE-based positioning device, and wherein the reporting the positioning measurement associated with the Rx TEG index includes reporting to the UE.

According to another embodiment, a method may include generating a transmit timing error group (Tx TEG) based on a time delay of a transmit (Tx) signal, wherein the time delay is a time measured from generation of the Tx signal at a baseband processor to a time of transmission of the Tx signal by a Tx antenna of a user equipment (UE), determining a timing error group (TEG) index corresponding to the generated Tx TEG, reporting an association information of sounding reference signal (SRS) resources for positioning with the Tx TEG index, and transmitting the SRS resources for 5G node B (gNB) measurement.

The Tx TEG may be further based on one or more reported UE capabilities.

The positioning comprises a relative time of arrival (RTOA) measurement.

The RTOA measurement is based on a transmission and reception point (TRP) associated with the Tx TEG index.

The method may further include pre-calibrating the time delay and compensating for the time delay based on the pre-calibrating.

The method may further include receiving a request from a corresponding gNB to report the Tx TEG index.

The reporting the association information of the SRS resources may include reporting to a Location Measurement Function (LMF) at a location server.

According to another embodiment, a method may include generating a receive and transmit timing error group (RxTx TEG) based on a time delay of a receive and transmit signal, wherein the receive and transmit signal is a time measured from an arrival of a downlink (DL) positioning reference signal (PRS) at a receive (Rx) antenna to a time of an uplink (UL) PRS is transmitted from a transmit (Tx) antenna of a user equipment (UE), determining a timing error group (TEG) index corresponding to the generated RxTx TEG, determining a positioning measurement from the Rx antenna and the Tx antenna, and reporting the positioning measurement associated with the RxTx TEG index.

The RxTx TEG may be further based on one or more reported UE capabilities.

The positioning measurement may include a UE Rx-Tx time difference.

The UE Rx-Tx time difference measurement may be based on a pair of PRS and SRS resources associated with the RxTx TEG.

The method may further include pre-calibrating the time delay and compensating for the time delay based on the pre-calibrating.

The method may further include receiving a request from the Location Management Function (LMF) to report the RxTx TEG index.

The reporting the positioning measurement may include reporting to an LMF at a location server.

According to another embodiment, a method may include determining, during a timing window in a time domain, a reference signal received power (RSRP) for an i-th path delay at a user equipment (UE), measuring the RSRP of an arrival of the i-th path delay, and reporting the measured RSRP for the i-th path delay to a location server, wherein the measured RSRP for the i-th path delay is a power of a received downlink (DL) position reference signal (PRS) configured for measurement at the i-th path delay of a channel response.

The RSRP may be a PRS RSRP.

The reporting the measurement RSRP may include M paths configured by a Location Management Function (LMF).

M may be a value selected from 1, 3, 5, 17, or 33.

The method may further include receiving a measurement request from an LMF to specify paths for the reporting the measure RSRP.

The method may further include determining a phase of the PRS RSRP corresponding to a first arrival path and additional N≥2 paths, wherein N≥2, and reporting the phase to the location server.

The method may further include determining a phase and an amplitude of the PRS RSRP corresponding to a first arrival path and additional N paths, where N≥2, and reporting the phase and the amplitude to the location server.

The method may further include determining an arrival time of the PRS RSRP corresponding to a first arrival path and additional N paths, where N≥2, and reporting the arrival time to the location server.

According another embodiment, a method may include determining a per-band combination (per-BC) maximum value of a position reference signal (PRS) for each frequency band and each carrier aggregation (CA) type, and reporting a largest one of the per-BC maximum value to a location server.

The method may further include reporting a 3-tuple indicator to the location server, wherein the 3-tuple indicator includes a maximum value of the PRS across Frequency Range 1 (FR1), a maximum value of the PRS across Frequency Range 2 (FR2), and a mixed maximum value of the PRS across both the FR1 and the FR2.

The 3-tuple indicator may be different for an intra-band contiguous CA, an intra-band non-contiguous CA, and inter-band CA.

The method may further include reporting a 5-tuple indicator to the location server, wherein the 5-tuple indicator includes a maximum value of the PRS for frequency bands in the FR1 in response to the per-BC including only the frequency bands in the FR1.

The method may further include reporting a 5-tuple indicator to the location server, wherein the 5-tuple indicator includes a maximum value of the PRS for frequency bands in the FR2 in response to the per-BC including only the— frequency bands in the FR2.

The method may further include reporting a 5-tuple indicator to the location server, wherein the 5-tuple indicator includes a maximum value of the PRS for frequency bands in the FR1 in response to the per-BC including both the FR1 and the FR2 bands.

The method may further include reporting a 5-tuple indicator to the location server, wherein the 5-tuple indicator includes a maximum value of the PRS for frequency bands in the FR2 in response to the per-BC including both the FR1 and the FR2 bands.

The method may further include reporting a 5-tuple indicator to the location server, wherein the 5-tuple indicator includes a maximum value of the PRS for frequency bands in the FR1 and the FR2 in response to the per-BC including both the FR1 and the FR2 bands.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 2 is an example table of timing error and a corresponding timing error group index, according to some embodiments.

FIG. 3 is an example algorithm used to define signal measurements, according to some embodiments.

FIG. 4 is another example algorithm used to define signal measurements, according to some embodiments.

Figure 1:
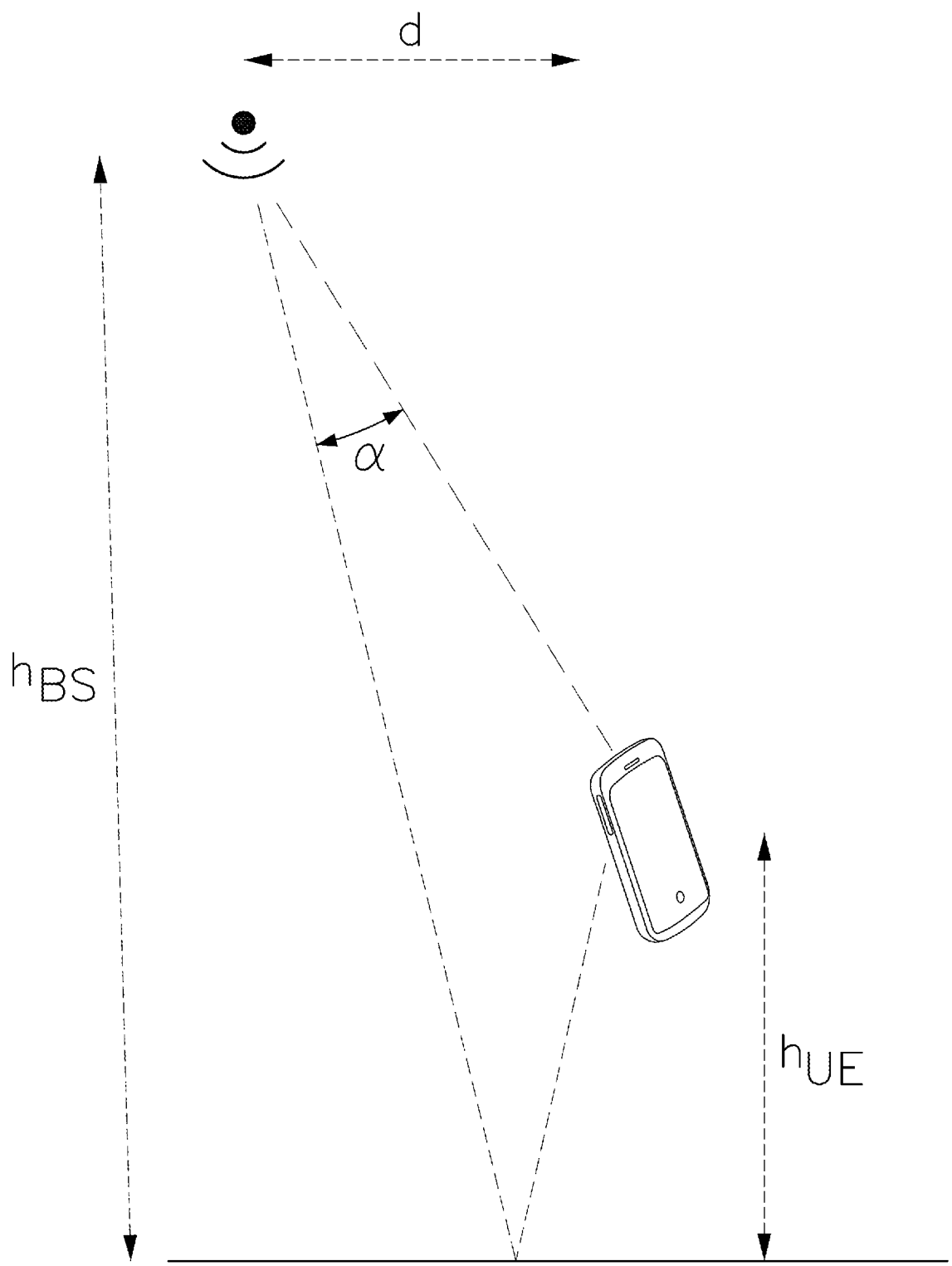
FIG. 1 is an illustration of a signal path between a base station and a user equipment, according to some embodiments.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure may not be described.

To address higher accuracy location requirements resulting from new applications and industry verticals, 5th Generation Mobile Network (5G) New Radio (NR) Positioning 3rd Generation Partnership Project (3GPP) in Release 17 (Rel-17) addresses and specifies enhancements and solutions to improve location accuracies. For example, for general commercial uses, the performance target may be a sub-meter level position accuracy (e.g., less than 1 m), whereas in industrial internet of things (IIoT) applications, the desired position accuracy may be, e.g., less than 0.2 m. Moreover, while the target latency may be less than 100 ms, in IIoT applications, the latency in the order of 10 ms may be desired in other applications. Thus, to meet such stricter accuracy requirements that may be imposed in Rel-17, timing- and angle-based positioning methods specified in Release 16 (Rel-16) may be enhanced by defining more accurate measurements for positioning. Accordingly, aspects of some embodiments of the present disclosure may include techniques for NR positioning enhancements. For example, some embodiments may include techniques to signal possible inaccuracies and to improve positioning accuracy.

In both User Equipment (UE) and base stations such as 5G Node B (gNB), a relatively large portion of the receive (Rx) and/or transmit (Tx) timing delays may be pre-calibrated for supporting transmission and reception of positioning reference signals (PRS). However, Rx/Tx timing errors still remain even after such pre-calibration. Additionally, different Rx/Tx antenna panels/RF chains may have the same or different Rx/Tx timing errors. To capture these timing errors, 3GPP Technical Specification Group Radio Access Network Working Group 1 (RAN1) introduced a concept of Timing Error Groups (TEG).

As used herein, timing error may be further specified as either a Tx timing error or a Rx timing error. Accordingly, from a signal transmission perspective, there exists a time delay from the time when a digital signal is generated at a baseband to the time when an RF signal is transmitted from a Tx antenna. To support NR positioning, the UE/Transmission and Reception Points (TRP) may implement an internal calibration/compensation of the Tx time delay for the transmission of the downlink (DL) PRS/uplink (UL) Sounding Reference Signal (SRS), which may also include the calibration/compensation of the relative time delay between different RF chains in the same TRP/UE. The compensation may also consider the offset of the Tx antenna phase center to the physical antenna center. However, the calibration may not be able to completely compensate all delays. Thus, the remaining Tx time delay after the calibration (e.g., the uncalibrated and remaining Tx time delay) may be defined as the Tx timing error.

From a signal reception perspective, there is a time delay from the time when the RF signal arrives at the Rx antenna to the time when the RF signal is digitized and time-stamped at the baseband. To support positioning, the UE/TRP may implement an internal calibration/compensation of the Rx time delay before it reports measurements that are obtained from the DL PRS/UL SRS signals. Such reporting may include the calibration/compensation of the relative time delay between different RF chains in the same TRP/UE. The compensation may also consider the offset by the Rx antenna phase center to the physical antenna center. However, the calibration may not be able to completely compensate all delays. Thus, the remaining Rx time delay after the calibration (e.g., the uncalibrated and remaining Rx time delay) may be defined as the Rx timing error.

Herein the present disclosure, a UE Tx TEG may be associated with the transmissions of one or more UL SRS resources for positioning purpose, which have the Tx timing errors within a certain margin. TRP Tx TEG may be associated with the transmissions of one or more DL PRS resources, which have the Tx timing errors within a certain margin. UE Rx TEG may be associated with one or more DL measurements, which have the Rx timing errors within a certain margin. TRP Rx TEG may be associated with one or more UL measurements, which have the Rx timing errors within a margin. UE RxTx TEG may be associated with one or more UE Rx-Tx time difference measurements, and one or more UL SRS resources for positioning, which have the "Rx timing errors+Tx timing errors" within a certain margin. TRP RxTx TEG may be associated with one or more gNB Rx-Tx time difference measurements and one or more DL PRS resources, which have the "Rx timing errors+Tx timing errors" within a certain margin.

According to a Rel-16 Downlink Angle of Departure (DL-AoD) positioning method, the UE position may be estimated based on DL PRS Reference Signal Received Power (RSRP) measurements taken at the UE of downlink radio signals from multiple transmission TRPs, along with knowledge of geographical coordinates of the TRPs and their relative downlink timing. The UE may use Channel State Information Reference Signal (CSI-RS) or PRS for the RSRP measurements. Once the RSRP is reported from the UE, a variety of methods may be available to estimate the DL-AoD. For example, fingerprinting may be used for estimation to determine the DL-AoD based on RSRP reports across multiple beams received from the same gNB at the UE.

However, a disadvantage with the RSRP reporting is that the UE may report the total power of all propagation paths. For example, the propagation paths may include both non-line-of-sight (NLOS) paths and line-of-sight (LOS) paths. Therefore, it may be suboptimal for positioning purposes by including all paths (both NLOS and LOS paths). As illustrated in FIG. 1, the angle between the LOS path and the NLOS path from a floor reflection may be provided as:

$$\alpha = \tan^{-1}\left(\frac{d}{h_{BS} - h_{UE}}\right) - \tan^{-1}\left(\frac{d}{h_{BS} + h_{UE}}\right)$$

For example, with a BS height h_Bs of 10 m, a UE height h_uE of 1.5 m and a horizontal distance d of 3 m an AoD difference a may be 5 degrees. Thus, significant degradation in DL AoD performance may be expected if the power of the NLOS paths are included in the RSRP measurement used for AoD estimation.

The DL PRS RSRP may be defined herein as a linear average over the power contributions (in Watts) of the resource elements that carry DL PRS reference signals configured for RSRP measurements within the considered measurement frequency bandwidth. Thus, the DL PRS RSRP includes the total received signal energy from all propagation paths. Additionally, the PRS RSRP is computed in the frequency domain (on the REs), and therefore obtaining the DL RSRP from the first path may be relatively difficult unless the signal is converted to the time domain. Thus, it is desirable to define a DL RSRP for the first path.

Because the DL PRS RSRP includes the total received signal power from all propagation paths and not just the power of the first path, the DL AoD may be less accurate. Thus, a measurement report that corresponds to the first arrival path that includes both LOS path and NLOS path may be considered. The following describes a first arrival path measurement for DL-AoD positioning according to some embodiments:

For both UE-based and UE-assisted DL-AoD cases, the following enhancements enable the UE to measure (for UE-based) and report (for UE-assisted) information related to the first arriving path:

Option 1: Information corresponds to PRS RSRP of the first arriving path.

Option 2: Information corresponds to the angle of departure of the first arriving path.

Option 3: Information corresponds to the arrival time of the first path.

Option 4: Information corresponds to phase of the CIR corresponding to the first arriving path.

Option 5: Information corresponds to received signal value (amplitude and phase of the channel estimated from the first path which can be achieved as a combination of option 1 and option 4) of the first arriving path.

Accordingly, embodiments of the present disclosure describe techniques for improving timing-based and angle-based positioning methods. In some embodiments, the timing-based and angle-based positioning methods may be improved through signaling designs for UE implementing measurement reporting (e.g., to the location server). In some embodiments, mechanisms for reporting the TEG are also described. For example, TEG reporting may include changes in capability signaling as well as radio resource control (RRC) signaling. Some embodiments may also include a definition for first path DL-RSRP.

In some embodiments, timing errors may be reduced or minimized by configuring the UEs to calibrate timing errors. For example, the UE may be placed at a known location where the delays from neighboring TRPs is known. By comparing the measured times to the actual known times, the UE may be configured to calibrate itself and correct its timing errors. However, not all UEs are sophisticated enough to be able to perform such calibration processes. Whereas some of the higher end UEs may be able to support timing error calibration, some of the lower end UEs may not be able to support such timing error calibration. In some embodiments, there may be varying degrees of calibration in which the UEs may perform. For example, some UEs may perform self-calibration, whereas other UEs may be able to provide information to the TRPs so that the TRPs can perform the calibration. Accordingly, embodiments of the present disclosure describe techniques for reporting capability of the UE. In some embodiments, the capabilities may include the ability for the UE to calibrate its timing. In other embodiments, the capabilities may also include providing measurements of the UE to the network (e.g., location server) to assist TRP timing calibration. In some embodiments, the UE capability may include timing errors, angle errors, and/or RSRP measurement errors.

In some embodiments, timing error may be reported in the form of TEG as described earlier. In timing-based positioning methods, it may be desirable that the UE capability indicates whether the UE supports Rx/Tx TEG reporting. By indicating the TEG of the UE, the network (e.g., location server) will be able to determine what positioning accuracy it can expect for this UE and allocate resources accordingly. For example, because positioning accuracy depends on the PRS bandwidth and the number of TRPs transmitting PRSs, the network may adjust the PRS overhead according to the UE TEG because the transmitting PRRs is an overhead.

In some embodiments, the TEG may be different for various positioning methods. For example, in a Downlink Time Difference of Arrival (DL-TDOA) method, the UE quantifies the Rx timing error, whereas in a multiple-round trip time (RTT) method, the UE quantifies the Rx timing error and the Tx timing error. As a result, the UE may report different capabilities on supporting TEG for different positioning methods. In addition, as explained earlier, the TEG may depend on the antenna panel used. Thus, a UE may report more than one TEG.

In some embodiments, several factors may impact the UE Rx/Tx timing error for positioning. For example, for UE reception, the sources of the timing error may come from time delay from antenna elements (RF) to the first stage of the baseband (e.g., analog to digital converter (ADC)), in which case the time delay may be dependent on frequency and temperature. On the other hand, if the timing error comes from the time delay on digital front end (DFE) processing after the ADC, the time delay may be bandwidth dependent. Furthermore, for both narrow beam and broad beam configurations, dynamic UE antenna array phase center offset may be a substantial contributor to the timing errors. Accordingly, such antenna array phase offsets may be seen as the timing delays that are dependent on the form factor of the device, antenna panel used, beam configuration, and the angle of the received/transmitted signal. Thus, if UE reports the capability for supporting TEG, such capability can also depend on UE processing bandwidth, carrier frequency, and beam configuration.

Accordingly, the UE may report the capability for supporting Rx/Tx TEG associated with the measurements for positioning. In some embodiments, the TEG may be reported for Rx, Tx, or for both Rx and Tx. Yet, in some embodiments, more than one TEG value may be reported.

In some embodiments, the TEG may be signaled as a timing error for a known set of conditions (e.g., carrier frequency, bandwidth, temperature, antenna panel used, beam configuration, angle of arrival (AoA)/angle of departure (AoD), etc. In some embodiments, the actual TEG may be determined from the signaled TEG according to various conditions experienced by the UE.

Some embodiments may include various mechanisms to report the TEG. One mechanism may include reporting the actual error for a given set of conditions such as, for example, temperature, bandwidth, carrier frequency, antenna panel used, beam configuration, and angle of arrival (AoA)/angle of departure (AoD). Thus, one mechanism to implement the TEG capability is to signal a maximum timing error for a given, known set of conditions. The TEG can then be determined according to the conditions. For example, for a doubling of the bandwidth, the timing error may be divided by two. Some factors may assume or may indicate (e.g., by a capability signal) some drift factors, for example, carrier frequency or temperature.

In some embodiments, the TEG for a set of measurements at the UE may be defined according to a number of different ways. One way may utilize an Rx/Tx antenna panel index to differentiate TEGs. For example, if two measurements are obtained through the signals received and/or transmitted at the same antenna, then these two measurements are associated with the same TEG. Moreover, the measurements that belong to the same TEG may contain approximately the same timing errors, which can be mitigated by location measurement function (LMF). In some embodiments, a TEG index may be determined by the value of timing error contained in the reported measurement. By this definition, the TEG can depend on PRS/SRS bandwidth, carrier frequency, and positioning method.

The TEG can be reported as a timing error indicator with each measured timing value. For measurement reporting of RSTD and Rx-Tx time difference, UE can report the Rx/Tx TEG associated with each reported measurement. For UE-assisted positioning method, gNB/UE report Rx/Tx TEG associated with the measurements to the LMF. For a UE-based positioning method, gNB reports Rx/Tx TEG associated with the measurements to UE.

In some embodiments, TRP Tx timing errors and/or UE Rx timing errors for DL TDOA may be mitigated by supporting a UE to provide the association information of RSTD measurements with UE Rx TEG(s) to the LMF when the UE reports the RSTD measurements to the LMF if the UE has multiple TEGs, supporting a TRP providing the association information of DL PRS resources with Tx TEGs to the LMF if the TRP has multiple TEGs, and supporting the LMF to provide the association information of DL PRS resources with Tx TEGs to a UE for UE-based positioning if the TRP has multiple TEGs.

In some embodiments, UE Tx timing errors and/or TRP Rx timing errors for UL TDOA may be mitigated by supporting a TRP to provide an association information of relative time of arrival (RTOA) measurements with TRP Rx TEG(s) to the LMF when the TRP reports the RTOA measurements to the LMF if the TRP has multiple Rx TEGs, and supporting a UE to provide under capability the association information of UL SRS resources for positioning with Tx TEGs to the LMF if the UE has multiple Tx TEGs.

In some embodiments, the UE measurement from the same antenna may contain timing errors that have different values. In such case, the TEG may be defined according to classes of thresholds to differentiate various TEGs under different scenarios. For example, for NR positioning in general commercial use cases, the TEG index may be defined according an index such as the ones shown below in a table in FIG. 2.

According to the example index in the table, if the timing error is less than 3.3 ns, then an index of 0 may be assigned. Similarly, a timing error of 3.3 ns to 5 ns may be assigned an index of 1, a timing error of 5 ns to 10 ns may be assigned an index of 2, and a timing error of greater than 10 ns may be assigned an index of 3. In some embodiments, because the timing error also depends on reference signal bandwidth, carrier frequency, and positioning method, the TEG defined by these timing errors may also be impacted by these factors. It should be noted that the table illustrated in FIG. 2 is an example and in other embodiments, different timing error and indexes may be replaced with other values.

When the TEG is defined as being equivalent to the antenna panel index, the TEG value may be determined by the UE/gNB implementation. However, in some embodiments, new signaling may be introduced for the TEG associated with the time measurement. For DL-TDOA, the signaling of TEG may be included in IE NR-DL-TDOA-SignalMeasurementln formation, and it may be reported together with the RSTD measurement in the IE NR-DL-TDOA-MeasElement. In 3GPP TS37.355, the IE NR-DL-TDOA-SignalMeasurementInformation is defined as shown in FIG. 3.

Thus, a new field nr-TEG may be added in NR-DL-TDOA-MeasElement-r16. This field may be an index indicating the TEG range that may be expected. In some embodiments, it could be an integer indicating the actual timing error in nanoseconds.

Similarly, for the Multi-RTT method, the new signaling of TEG may be included in IE NR-Multi-RTT-MeasElement and reported together with IE nr-UE-RxTxTimeDiff. When TEG is defined as the Rx/Tx timing error indicator for each timing measurement, new signaling is also utilized. The existing IE NR-DL-TDOA-Error and IE NR-Multi-RTT-Error in Rel-16 may be used by the location server or the target device to provide the error reasons to the target device or location server respectively, but may not be related to the Rx/Tx timing error values. The existing IE OTDOA-MeasQuality and IE NR-TimingQualityare defined in 3GPP TS 37.355 are for timing measurement quality indication.

In some embodiments, timing measurement UE may report the error between the estimated position (or distance between reference gNB and UE) and the true UE position as the measurement quality metrics. The true location of the UE may be obtained with high accuracy by other positioning techniques such as GNSS. The definition of TEG may be different, which is the remaining timing error including inherent delay between baseband and antenna and antenna array phase center offset after calibration. Accordingly, even when quality indicators are provided, e.g., in OTDOA-MeasQuality, the TEG is still utilized. The new signaling for TEG as a timing error indicator may be included in IE NR-DL-TDOA-MeasElement for DL-TDOA method and IE NR-Multi-RTT-MeasElement for Multi-RTT method and it should be reported together with its corresponding timing measurement.

When UE supports the Rx/Tx TEG reporting, the reported TEG may be associated with each measurement. For example, when UE reports RSTD and Rx-Tx timing difference, it can also report the associated TEG for each measurement. For UE-assisted positioning method, the position may be calculated by the location server, thus gNB and UE may report Rx/Tx TEG with the measurements to LMF. For UE-based positioning, the UE will know of the TEGs associated with the TRPs, thus the TRPs will signal this information.

In some embodiments, position may be determined by an angle-based position method. In an angle-based positioning method, the RSRP may be reported to the location server, and the location server can then determine the angle of departure (AoD) of the RSRP signal from the gNB to the UE based on the reported RSRP.

In some embodiments, it may be desirable to improve the accuracy of such angle-based measurements of the signal from the gNB to the UE or from the UE to the gNB. In some embodiments, the signal from the gNB to the UE may be referred to as the angle of departure (AoD), and the signal from the UE to the gNB may be referred to as the angle of arrival (AoA).

In some embodiments, the path dependent PRS RSRP may be defined as the power of specific paths in the channel impulse response of a received DL-PRS resource. For example, the PRS RSRP corresponding to the first arrival path is defined as the power of the first arrival path in the channel impulse response of a received DL-PRS resource. Accordingly, the NR DL-AoD may be reported to the location server together with the measurements for the first arrival path or for all of the arrival paths. If this indicator is not reported, the location server may assume that the measurement is done on all paths.

For DL-AoD positioning, the PRS-RSRP defined in 3GPP TS38.215 may be the linear average over the power contributions (in Watts) of the resource elements that carry DL PRS reference signals configured for RSRP measurements. This means that the DL PRS RSRP includes the total received signal energy from all propagation paths. To handle this problem, the power may be measured and reported for the LOS path alone. In some embodiments, the path dependent PRS RSRP measurement for the power of specific paths in the channel impulse response of a received DL-PRS resource may be defined. Accordingly, UE can report the PRS PSRP corresponding to the first arrival path and other paths in DL-AoD measurement reporting. In some embodiments, the UE may be implemented to identify the first arrival path. Besides PRS RSRP, the UE can also report the phase and the arrival time for the first arrival path and its adjacent paths. The new path dependent PRS RSRP may be included in the IE NR-DL-AoD-SignalMeasurementlnformation as shown in FIG. 4.

In some embodiments, in addition to introducing a new path related PRS RSRP, an indicator in the configuration for DL-AoD may be introduced to specify that the reported measurement is for the first arrival path or for all of the paths. The indicator may be included in IE NR-DL-AoD-MeasElement alongside with PRS RSRP measurement report. If this indicator is not present, the network assumes that the measurement is done on all paths.

In some embodiments, the UE may be configured to report the phase of received PRS, the phase plus amplitude of received PRS, and the arrival time corresponding to the first arrival path and its adjacent paths. The UE can also be configured to measure and report according to the other paths in addition to the first arrival path, for example the first three arrival paths.

In cases where the PRS is transmitted through multiple antenna ports at the gNB, the UE can be configured to measure and report the phase difference between two received multi-port PRS signals corresponding to the first arrival path.

Figure 5:
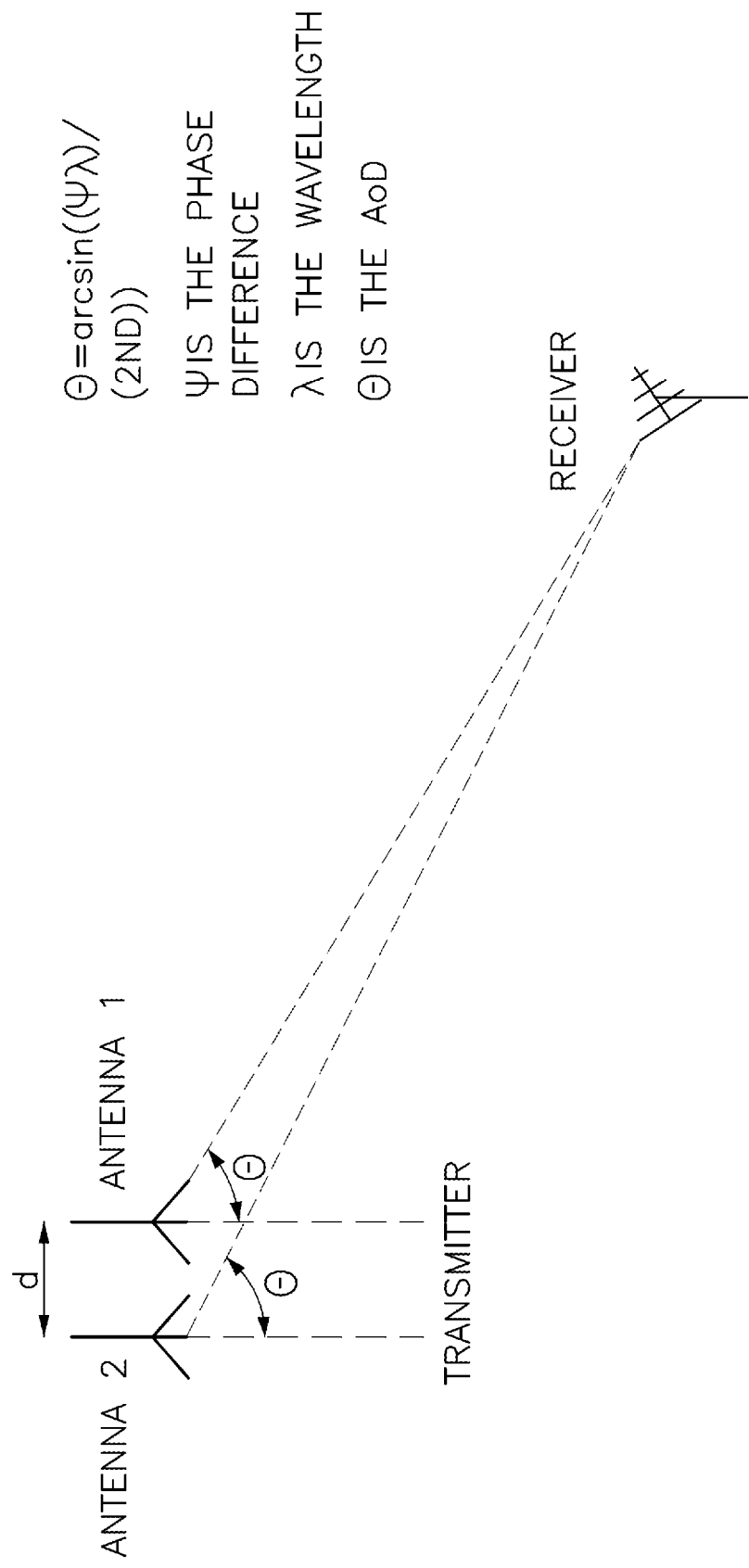
FIG. 5 is an illustration of a signal path between two antenna arrays and a receiver, according to some embodiments.

In some embodiments, the DL-AoD may be determined based on the knowledge of the mapping of the PRS resources into the physical antennas, along with the UPA configuration of the TRP and the relative distance of the antennas. For example, the transmitting device may first send multiple PRS resources, wherein each PRS resource is sent via each of the physical antennas. As each PRS from the antennas in the array arrives at the receiver's single antenna, each PRS may be phase shifted from the previous PRS due to the different distance that the PRS has traveled from the transmitter as shown graphically in FIG. 5. Accordingly, the angle of departure may be estimated by measuring the phase difference between the PRS resources using simple arithmetic.

In some embodiments, the gNB may send the two PRS with the same resource configuration from two different antenna ports to implement the phase difference DL-AoD measurement technique. Accordingly, the UE may measure the phase difference between the two received PRS signals, and then report the phase difference to LMF.

In some embodiments, aggregation PRS signals may be advantageous over different positioning frequency layers. Certain simulation results show that aggregation of NR positioning frequency layers improves positioning accuracy under certain scenarios, configurations, and assumptions on modeled impairments such as: bandwidth and spacing of aggregated layers, timing offset and frequency offset over frequency layers, phase discontinuity and possible amplitude imbalance.

Similar to long-term evolution (LTE), multiple NR carriers can be aggregated and transmitted in parallel to/from the same UE, thereby allowing for an overall wider bandwidth and correspondingly higher per-link data rates. The carriers do not have to be contiguous in the frequency domain but can be dispersed, both in the same frequency band as well as in different frequency bands, resulting in three difference scenarios: 1) intra-band aggregation with frequency-contiguous component carriers; 2) intra-band aggregation with non-contiguous component carriers; and 3) inter-band aggregation with non-contiguous component carriers.

Although the overall structure may be the similar in all three cases, the RF complexity can be different. For example, up to 16 carriers, possibly of different bandwidths and different duplex schemes, may be aggregated allowing for overall transmission bandwidths of up 16×400 MHz (6.4 GHz), which is far beyond typical spectrum allocations.

In carrier aggregation (CA), two or more Component Carriers (CCs) are aggregated. A UE may simultaneously receive or transmit on one or multiple CCs depending on its capabilities. A non-CA capable UE can receive on a single CC and transmit on a single CC corresponding to one serving cell (e.g., one serving cell in one TAG). In some embodiments, CA may be supported for both contiguous and non-contiguous CCs. The maximum number of configured CCs for a UE is 16 for downlink and 16 for uplink. For Rel-16 CA, mixed numerology across CCs is supported, which means different sub-carrier spacing (SCS) may be applied to different CCs in the carrier aggregation.

In 3GPP TS 38.306 and 38.822, a UE capability signaling refers to the mechanism with which the UE informs the gNB of its capability to perform certain features. The following are non-limiting examples of ways for reporting UE capability. For example, the UE can report its capability to perform certain features in any scenario. In this case, the UE reports its capability on a per-UE basis. In some embodiments, the UE can report its capability to perform certain features in particular bands. In this case, the UE reports its capability on a per-band basis. In some embodiments, the UE can report its capability to perform certain features in particular band combinations for CA. In this case, the UE reports its capability on a per-band combination (BC) or per-BC basis. In some embodiments, the UE can report its capability to perform certain features in specific band(s) in particular band combination for CA. In this case, a mechanism referred to as feature sets can be used to allow for such flexibility in reporting, and the UE reports its capability on a per-featureSet or per-FS basis. In some embodiments, the UE can report its capability to perform certain features in specific CCs in certain band combinations for CA. In this case, a mechanism referred to as feature sets per CC may be used to allow for such flexibility in reporting, and the UE reports its capability on a per-featureSet per CC or per-FSPC basis.

In some embodiments, band combination is a collection of bands to represent CA configuration as described in 3GPP TS 38.101. According to the above described example ways for reporting UE capability, the UE's flexibility for declaring support of certain features may increase. For example, if feature A and feature B are per-FSPC, a UE may have flexibility for supporting only one of feature A and B in each CC. However, if the features are instead per-UE, then a UE would always need to support or not support. The trade-off to added flexibility is its overhead in signaling. Hence, determination of how a certain feature is declared may acknowledge complexity of the feature in UE implementation and associated signaling overhead.

In Rel-16 UE capability reporting for NR positioning, UE reports the maximum DL PRS bandwidth in MHz for frequency range 1 (FR1) bands and frequency range 2 (FR2) bands separately. Furthermore, for different positioning methods, UE also reports the supported maximum number of DL PRS resources across all frequency layers, TRPs and DL PRS Resource Sets per band combination (BC) for FR1 bands, FR2 bands, and mixed FR1 and FR2 bands. The UE capability for NR positioning in Rel-16 includes: Maximum DL PRS bandwidth in MHz, which is supported and reported by UE per band, is given by:

FR1 bands: {5, 10, 20, 40, 50, 80, 100}; and FR2 bands: {50, 100, 200, 400}.

For positioning methods including DL-AoD, DL-TDOA, Multi-RTT, UE reports the following for the supported BC:

Maximum number of DL PRS Resources supported by UE across all frequency layers, TRPs and DL PRS Resource Sets for FR1-only is given by {6, 24, 64, 128, 192, 256, 512, 1024, 2048}, and this is reported for FR1 only BC.

Maximum number of DL PRS Resources supported by UE across all frequency layers, TRPs and DL PRS Resource Sets for FR2-only is given by {24, 64, 96, 128, 192, 256, 512, 1024, 2048}, and this is reported for FR2 only BC.

Maximum number of DL PRS Resources supported by UE across all frequency layers, TRPs and DL PRS Resource Sets for FR1 in FR1/FR2 mixed operation is given by {6, 24, 64, 128, 192, 256, 512, 1024, 2048}, and this is reported for BC containing FR1 and FR2 bands.

Maximum number of DL PRS Resources supported by UE across all frequency layers, TRPs and DL PRS Resource Sets for FR2 in FR1/FR2 mixed operation is given by {24, 64, 96, 128, 192, 256, 512, 1024, 2048}, and this is reported for BC containing FR1 and FR2 bands.

The SRS for positioning is configured by the higher layer parameter within the active UL BWP of the UE. Before configuration of SRS, UE reports a maximum number of SRS resources/resource sets for positioning supported by UE per BWP. UE can report the capability for SRS resource on a per-FS base or on a per-band base. In some embodiments, UE can also report the following per-band based capability for SRS resources:

Maximum number of SRS Resource Sets for positioning supported by UE per BWP. Values={1, 2, 4, 8, 12, 16}.

Maximum number of P/SP/AP SRS Resources for positioning per BWP. Values={1,2,4,8,16,32,64}.

Maximum number of periodic SRS Resources for positioning per BWP. Values={1,2,4,8,16,32,64}.

In some embodiments, the UE can also report the capability on a per-FS base by adding the following items:

Maximum number of P/SP/AP SRS Resources including the SRS resources for positioning per BWP per slot. Values={1, 2, 3, 4, 5, 6, 8, 10, 12, 14}.

Maximum number of periodic SRS Resources for positioning per BWP per slot. Values={1,2,3,4,5,6,8,10,12,14}.

In some embodiments, one issue of aggregating PRS for positioning in multiple carriers is that the overall signal bandwidth may exceed the UE supported channel bandwidth. In such a scenario, UE implementation may become more complex if the UE intends to support the feature of aggregating PRS for positioning in multiple carriers. This issue may be addressed by introducing a new UE capability for the aggregation of PRS in multiple carriers. The maximum transmission bandwidth for each UE channel bandwidth and subcarrier spacing is specified in Table 5.3.2-1 in 3GPP TS 38.101-1 and 38.101-2.

When PRS from multiple carriers is aggregated for improving the positioning accuracy, UE can report a capability indicator to the network (e.g., location server) to clarify if it can support the case when the aggregated PRS bandwidth is larger than the maximum transmission bandwidth defined in 3GPP TS 38.101-1 and TS 38.101-2.

On the other hand, in Rel-16 UE capability for NR positioning, the maximum DL PRS bandwidth in MHz, which is supported and reported by UE is defined for FR1 bands and FR2 bands separately. Furthermore, for positioning methods DL-AoD, DL-TDOA, and Multi-RTT, the maximum number of DL PRS resources supported by the UE across all frequency layers, TRPs, and DL PRS Resource Sets are defined per band combination (BC) for FR1 bands, FR2 bands, and a mix of FR1 and FR2 bands.

In 3GPP TS 38.101-1, the CA configuration and bandwidth combination are defined as follows: For intra-band contiguous carrier aggregation, a carrier aggregation configuration is a single operating band supporting a carrier aggregation bandwidth class with associated bandwidth combination sets. For each carrier aggregation configuration, requirements are specified for all aggregated channel bandwidths contained in a bandwidth combination set, and a UE can indicate support of several bandwidth combination sets per carrier aggregation configuration. For intra-band non-contiguous carrier aggregation, a carrier aggregation configuration may be a single operating band supporting two or more sub-blocks, each supporting a carrier aggregation bandwidth class. For inter-band carrier aggregation, a carrier aggregation configuration is a combination of operating bands, each supporting a carrier aggregation bandwidth class.

Based on the existing Rel-16 UE capability on positioning, we introduce new UE capability for the NR positioning with aggregated PRS from different frequency layers. Two possible examples of quantities to be reported are the maximum PRS bandwidth and the maximum number of PRS resources.

The signaling may provide the maximum value in a given band. The value range of such signaling can be different when such a band includes intra-band contiguous CA and/or non-contiguous CA. The value of signaling may be affected by the existence of other bands in certain CA combinations. In this case, a tuple including all bands may be reported per CA combination. The value range of such signaling for each band may be different when other bands in the CA combination include intra-band contiguous CA and/or non-contiguous CA. In some embodiments, the signaling may provide the maximum value in a set of bands. Such a set of bands can be within each frequency range, and the value range of such signaling may be different depending on frequency range. For example, the signaling may provide the maximum value for each frequency range. The value of signaling may be affected by the existence of other frequency range in a certain CA combination. In this case, a tuple including all frequency ranges may be reported per CA combination. The value range of such signaling for each frequency range may be different when other frequency ranges in the CA combination include intra-band contiguous CA and/or non-contiguous CA.

In some embodiments, the UE reports the per-BC based capability for the maximum value. The designed signaling may include various reporting granularities. For example, the value range of the signaling may be different for the BC containing FR1 bands, the BC containing FR2 bands, and the BC containing both FR1 and FR2 bands. Besides the affect by the frequency bands, the maximum value range may also be different for intra-band CA and inter-band CA. As a result, the UE may report different maximum values for intra-band CA and inter-band CA in FR1 bands and FR2 bands, respectively. If a BC includes multiple combinations of CA types (e.g., intra-band CA and inter-band CA) and frequency bands (e.g., FR1 and FR2 bands) with different maximum values corresponding to the combinations, the UE may report the maximum one among the different values.

In some embodiment, fallback BC may be defined in 3GPP TS 38.306 as a BC that results from another BC by releasing at least one SCell or uplink configuration of SCell or SCG. An intra-band non-contiguous BC is not considered to be a fallback band combination of an intra-band contiguous BC. If fallback BC is considered in the UE report for maximum values, additional signaling may be needed for reporting. One case is that UE configured for inter-band CA could fall back to intra-band CA. In this case, the UE may report five maximum values: one for inter-band CA in FR1 bands, one for inter-band CA in FR2 bands, one for inter-band CA in mixed FR1 and FR2 bands, one for intra-band CA in FR1 bands, and one for intra-band CA in FR2 bands. Accordingly, if fallback is allowed, then the UE will report multiple values for the capability including the maximum values for the current BC and the fallback BCs.

In some embodiments, the format of per-BC based capability is such that the UE reports a 3-tuple (e.g., triple) indication vector which includes the maximum values in FR1 bands, in FR2 bands, and in mixed FR1 bands and FR2 bands. The reported values for the 3-tuple indication vector may be different for intra-band contiguous CA, intra-band non-contiguous CA, and inter-band CA. If the UE does not support inter-band CA across FR1 and FR2 bands, the UE will not report the third element in the n-tuple indicators. If the fallback BC is considered in the reporting, then more elements representing the maximum values for the fallback BCs may be added into the indication vector.

In some embodiments, the UE may report the maximum aggregated value in the per-BC manner for FR1 bands, FR2 bands, FR1 bands in the FR1 and FR2 mixed bands, FR2 bands in the FR1 and FR2 mixed bands, FR1 together with FR2 bands in the FR1 and FR2 mixed bands. Thus, when PRS aggregation across different carrier components and positioning frequency layers is supported, the UE may report a 5-tuple indicator vector that may include the maximum aggregated value supported for the band combination in FR1 bands when the BC contains FR1 bands only, FR2 bands when the BC contains FR2 bands only, FR1 bands only when the BC contains both FR1 and FR2 bands, FR2 bands only when the BC contains both FR1 and FR2 bands, and FR1 and FR2 bands together when the BC contains both FR1 and FR2 bands. The case where different SCSs are used in different CCs are not supported for the aggregation of DL PRS from different positioning frequency layers.

In some embodiments, when PRS aggregation is used across different carriers, the aggregated PRS may be fragmented and may not necessarily cover adjacent PRBs. This may occur because, e.g., non-adjacent carriers may be also allocated to the UE, either in an intra-band or inter-band deployment scenario. For example, this may occur when parts of the PRS are transmitted in FR1 and the other parts are transmitted in FR2.

Figure 6:
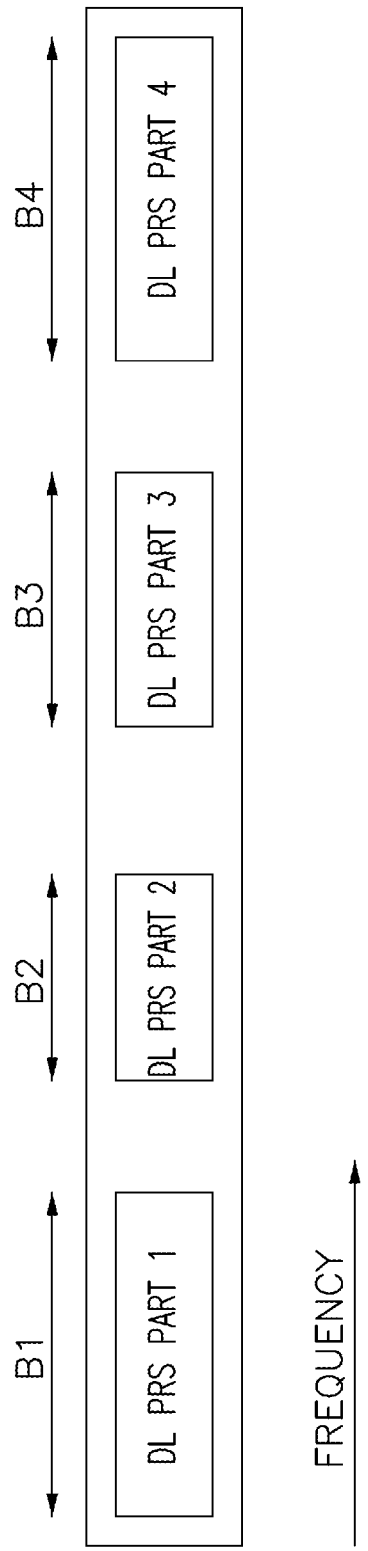
FIG. 6 is a graphical illustration of an example non-contiguous aggregated PRS transmission, according to some embodiments.

FIG. 6 illustrates an example of a DL PRS that is fragmented into four different parts, wherein each part i occupies a bandwidth Bi. In some embodiments, the upper bound may be determined as B1+B2+B3+B4. In some embodiments, additional limits may be put on each individual DL PRS part. For example, the transmission of an individual DL PRS part may be limited to 80 MHz in FR1 and 200 MHz in FR2, according to one example. It should be noted that these limits are only examples and other limits may be envisaged. In some embodiments, the UE capability may be defined as the maximum size (in terms of MHz or number of RBs) that an individual DL PRS part can occupy. Here, the UE capability may be referred to as Fractioned-DLPRS.

In some embodiments, the UE capability may include support for fractioning the DL PRS into non-adjacent parts. However, such support may instead be included in the UE capability associated with the 5-tuple indicator vector explained above. In some embodiments, the support may implicitly be indicated by sending FractionedDLPRS and the non-support by not sending the FractionedDLPRS.

In some embodiments, PRS aggregation across different carrier components and positioning frequency layers may be supported. In such case, the UE can split and transmit a PRS into several non-frequency-adjacent parts. If the UE is capable of supporting this feature, the UE may be configured to report the maximum bandwidth of a DL PRS part for FR1 and FR2.

In cases where there is aggregation of PRS from multiple frequency layers, the aggregated PRS bandwidth should not be larger than the maximum DL PRS bandwidth reported in a Rel-16 UE capability for positioning if UE reports this capability. If UE does not report the capability of maximum DL PRS bandwidth, the maximum transmission bandwidth for DL PRS aggregation across multiple positioning frequency layers should not be larger than the maximum UE supported bandwidth defined in 3GPP TS 38.101-1 for FR1 bands and TS 38.101-2 for FR2 bands.

In some embodiments, similar to PRS aggregation, SRS may be simultaneously transmitted by UE and received by the gNB across multiple carrier components and multiple slots. Accordingly, for SRS aggregation, the UE may report the maximum SRS resources (e.g., resource sets) supported across all the carrier components for intra-band contiguous CA, intra-band non-contiguous CA, and inter-band CA in FR1 bands and FR2 bands. Such a reporting for SRS aggregation may be either on a per-band base for UE capability on frequency domain only or on a per-FS base for UE capability on both time and frequency domain.

Accordingly, when SRS aggregation across different carrier components is supported, the UE capability reporting on a per-band basis may report the maximum number of SRS Resource Sets for positioning supported by the UE across all the carrier components for intra-band contiguous CA, intra-band non-contiguous CA, and inter-band CA. The reported values can be different for the CA in FR1 bands and FR2 bands. In this case, there is no inter-band CA across FR1 and FR2 supported for SRS aggregation.

In some embodiments, the maximum number of periodic/semi-persistent/aperiodic SRS Resources for positioning across all the carrier components for intra-band contiguous CA, intra-band non-contiguous CA, inter-band CA may also be reported. The reported values may be different for the CA in FR1 bands and FR2 bands.

According to another embodiment, when the SRS aggregation across different carrier components is supported, the UE capability reporting on a per-band basis may report a 6-tuple vector including the maximum number of SRS Resource Sets across all the carrier components for intra-band contiguous CA in FR1 bands, intra-band contiguous CA in FR2 bands, intra-band non-contiguous CA in FR1 bands, intra-band non-contiguous CA in FR2 bands, inter-band CA in FR1 bands and inter-band CA in FR2 bands. In this case, if the UE supports only one frequency range (e.g., FR1), then the UE would report only two values.

In some embodiments, three sets of 6-tuple vectors for periodic SRS, semi-persistent SRS, and aperiodic SRS, respectively and each vector may include a maximum number of SRS Resources across all the carrier components for intra-band contiguous CA in FR1 bands, intra-band contiguous CA in FR2 bands, intra-band non-contiguous CA in FR1 bands, intra-band non-contiguous CA in FR2 bands, inter-band CA in FR1 bands and inter-band CA in FR2 bands. In some embodiments, the UE may report a single 6-tuple vector that may be applicable for a periodic/semi-periodic/aperiodic SRS.

According to another embodiment, when the SRS aggregation across different carrier components is supported, the UE capability reporting on a per-FS basis may report a maximum number of periodic/semi-persistent/aperiodic SRS Resources across all the carrier components per slot for intra-band contiguous CA, intra-band non-contiguous CA, inter-band CA. In some embodiments, the reported values may be different for the CA in FR1 bands and FR2 bands.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

Figure 7:
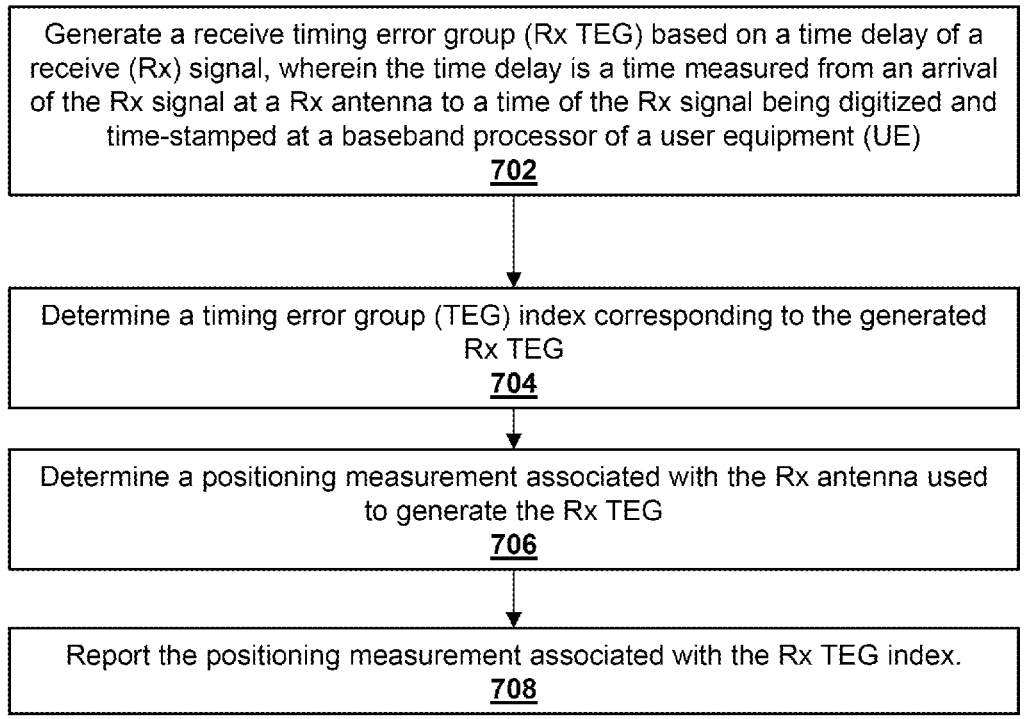
FIGS. 7-9 are flow charts illustrating methods for performing positioning based on timing, according to some embodiments.

FIG. 7 is a flow chart illustrating a method for performing positioning based on timing, according to some embodiments of the present disclosure. The positioning may be an NR positioning such as those that may be implemented in a 5G network system.

In such systems, the positioning may be performed by a UE as a UE-based positioning device where the positioning operations are performed by the UE, and as a UE-assisted positioning device where the positioning operations are performed off of the UE such as at a location server.

According to a first step, the method may include generating a Rx TEG based on a time delay of a Rx signal, wherein the time delay is a time measured from an arrival of the Rx signal at a Rx antenna to a time of the Rx signal being digitized and time-stamped at a baseband processor of a UE (702). For example, the Rx signal may be an RF signal that is received by the Rx antenna of the UE. The RF signal may be transmitted in the UE from the Rx antenna to the baseband processor of the UE where the RF signal is digitized and time-stamped for processing. Accordingly, the time delay is the amount of time it takes the RF signal to travel from the Rx antenna to the baseband processor.

Next, a TEG index corresponding to the generated Rx TEG is determined (704). The TEG index may be determined based on a table such as the one shown in FIG. 2 by way of example, wherein a TEG index of 0, 1, 2, or 3 is selected based on the Rx TEG. Next, a positioning measurement associated with the Rx antenna used to generate the Rx TEG is determined (706), and the positioning measurement associated with the Rx TEG index is reported (708). In some embodiments, the positioning measurement may include an RSTD measurement, which is based on a PRS associated with the Rx TEG.

In some embodiments, the UE may receive a request from an LMF to report the Rx TEG. When the UE operates as a UE-assisted positioning device, for example, because the UE is not capable of operating as a UE-based positioning device which may be a more sophisticated device, then the positioning measurement is reported to the LMF at a location server. In other embodiments, when the UE operates as a UE-based positioning device because the UE has such capabilities, then the positioning measurement associated with the Rx TEG is reported to the UE.

Figure 8:
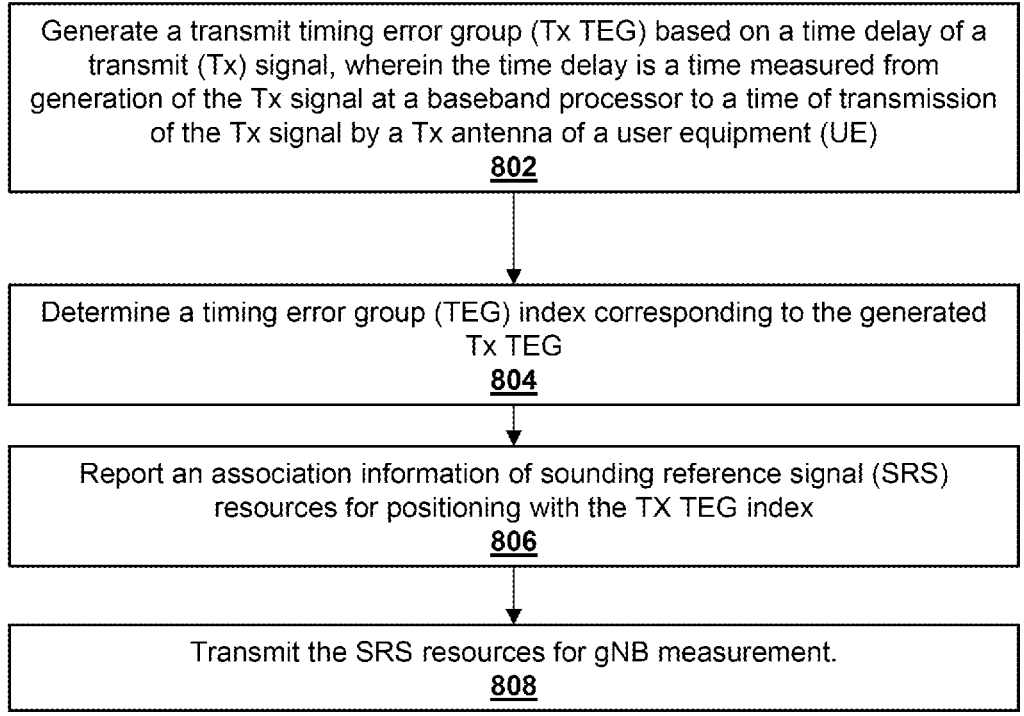

FIG. 8 is a flow chart illustrating another method for performing positioning based on timing, according to some embodiments of the present disclosure. According to a first step, the method may include generating a Tx TEG based on a time delay of a Tx signal, wherein the time delay is a time measured from generation of the Tx signal at a baseband processor to a time of transmission of the Tx signal by a Tx antenna of a UE (802). In some embodiments, the Tx signal may be a digital signal that is generated at the baseband processor, and the time delay is the amount of time it takes for the digital signal to travel from the baseband processor to the Tx antenna.

Next, the TEG index corresponding to the generated Tx TEG is determined (804). The TEG index may be determined based on a table such as the one shown in FIG. 2 by way of example, wherein a TEG index of 0, 1, 2, or 3 is selected based on the Tx TEG. Next, an association information of SRS resources for positioning with the Tx TEG index is reported (806), and the SRS resources for gNB measurement is transmitted (808).

In some embodiments, the reporting of the Tx TEG index is based on receiving a request from a corresponding gNB, and the association information of the SRS sources is reported to the LMF at a location server.

Figure 9:
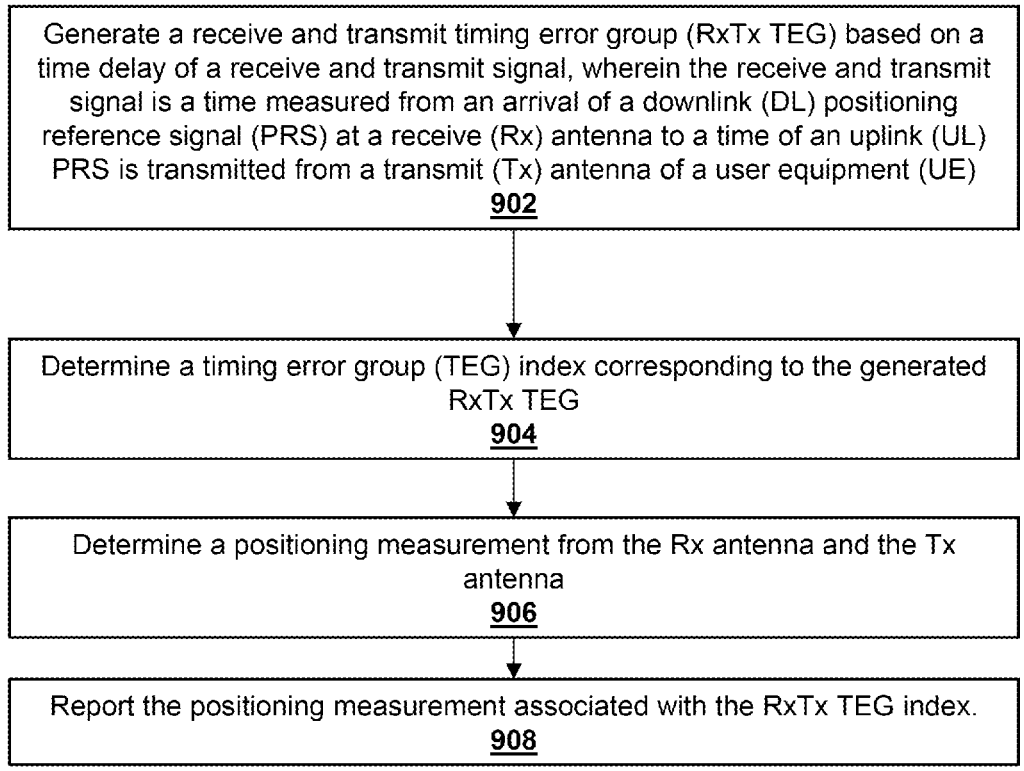

FIG. 9 is a flow chart illustrating yet another method for performing positioning based on timing, according to some embodiments of the present disclosure. According to a first step, the method may include generating an RxTx TEG based on a time delay of a receive and transmit signal, wherein the receive and transmit signal is a time measured from an arrival of a DL PRS at an Rx antenna to a time of a UL PRS is transmitted from a Tx antenna of a UE (902). Next, the timing error group (TEG) index corresponding to the generated RxTx TEG is determined (904). In some embodiments, the TEG index may be determined based on a table such as the one shown in FIG. 2 by way of example, wherein a TEG index of 0, 1, 2, or 3 is selected based on the RxTx TEG.

Next, a positioning measurement from the Rx antenna and the Tx antenna may be determined (906), and the positioning measurement associated with the RxTx TEG index may be reported (908). In some embodiments, the RxTx TEG index may be reported in response to a request received from an LMF to report the RxTx TEG index. The LMF may be located at a location server and thus, the RxTx TEG index may be reported to the LMF at the location server.

Figure 10:
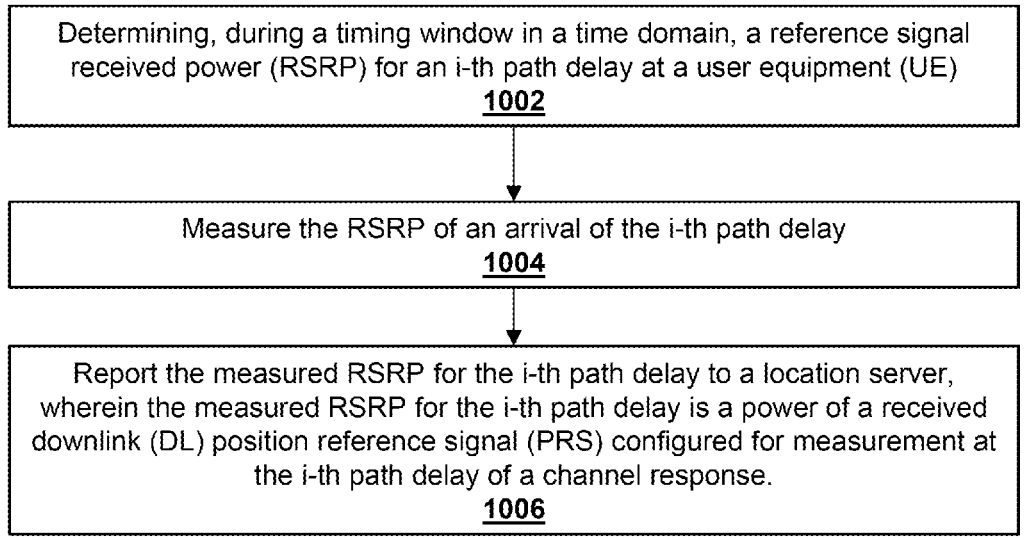
FIGS. 10-11 are flow charts illustrating methods for performing positioning based angles, according to some embodiments.

FIG. 10 is a flow chart illustrating methods for performing positioning based angles, according to some embodiments of the present disclosure. According to a first step, the method may include determining, during a timing window in a time domain, an RSRP for an i-th path delay at a UE (1002). Next, the RSRP of an arrival of the i-th path delay may be measured (1004) and the measured RSRP for the i-th path delay to a location server may be reported. The measured RSRP for the i-th path delay may be a power of a received DL PRS configured for measurement at the i-th path delay of a channel response (1006).

Figure 11:
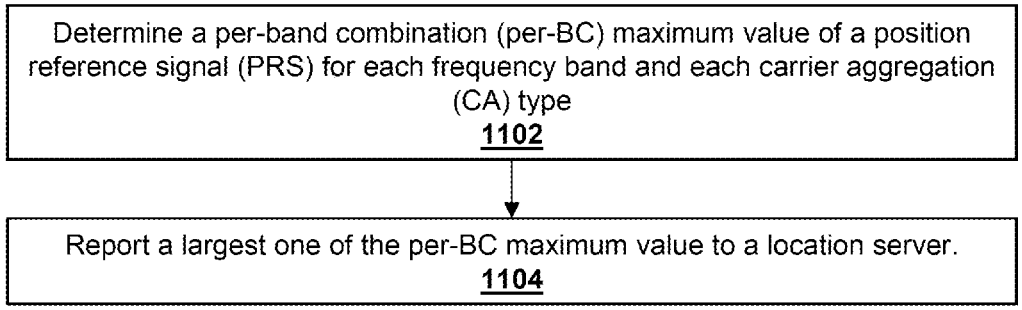

FIG. 11 is a flow chart illustrating methods for performing positioning based angles, according to some embodiments of the present disclosure. According to a first step, the method may include determining a per-band combination (per-BC) maximum value of a PRS for each frequency band and each CA type (1102) and then reporting a largest one of the per-BC maximum value to a location server (1104).

Figure 12:
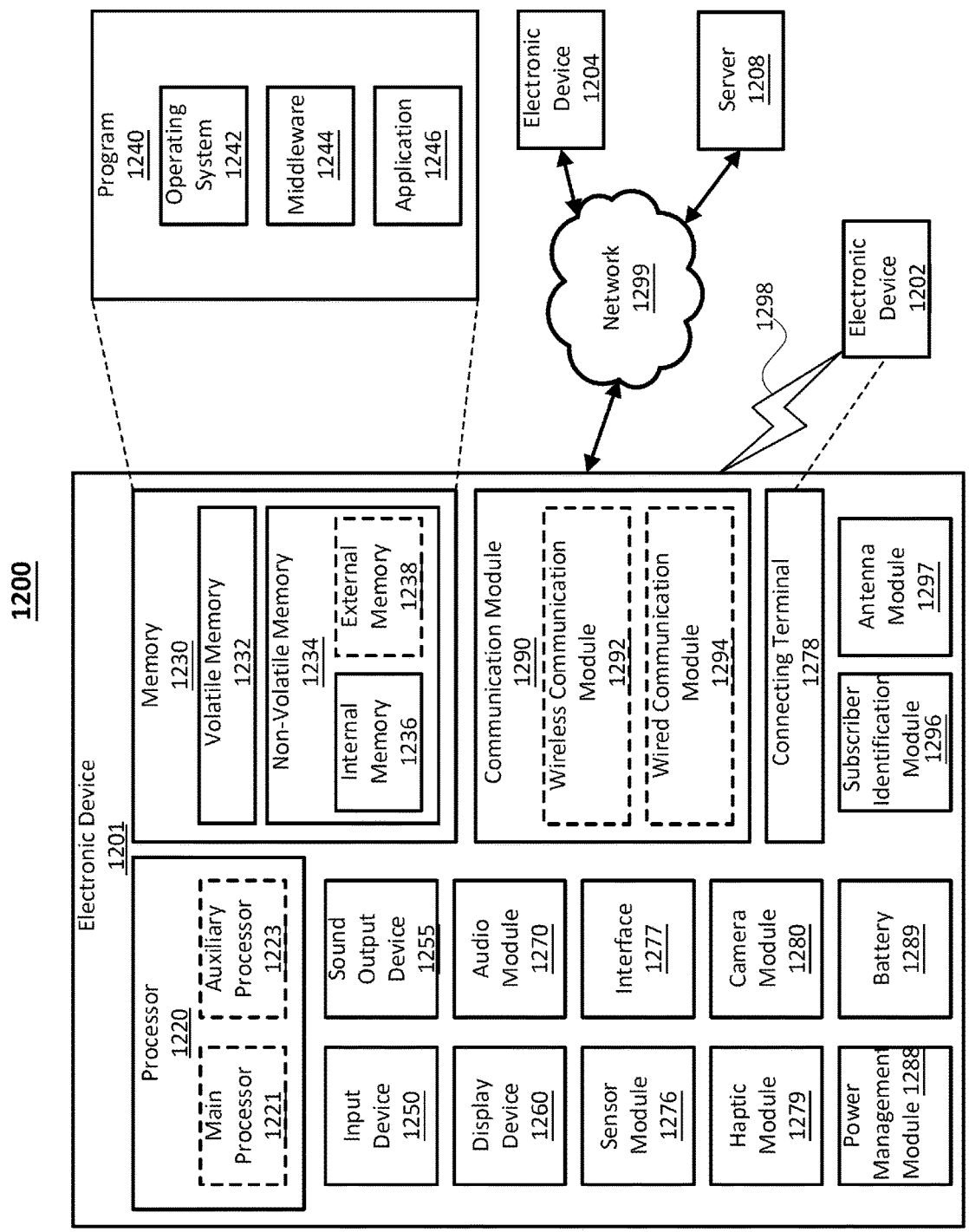
FIG. 12 is a block diagram of an electronic device in a network environment, according to some embodiments.

FIG. 12 illustrates a block diagram of an electronic device 1201 in a network environment 1200, according to an embodiment. Referring to FIG. 12, the electronic device 1201 in the network environment 1200 may communicate with another electronic device 1202 via a first network 1298 (e.g., a short-range wireless communication network), or another electronic device 1204 or a server 1208 via a second network 1299 (e.g., a long-range wireless communication network). The electronic device 1201 may also communicate with the electronic device 1204 via the server 1208. The electronic device 1201 may include a processor 1220, a memory 1230, an input device 1250, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) 1296, or an antenna module 1297. In one embodiment, at least one (e.g., the display device 1260 or the camera module 1280) of the components may be omitted from the electronic device 1201, or one or more other components may be added to the electronic device 1201. In one embodiment, some of the components may be implemented as a single integrated circuit (IC). For example, the sensor module 1276 (e.g., a fingerprint sensor, an iris sensor, or an illuminance sensor) may be embedded in the display device 1260 (e.g., a display).

The processor 1220 may execute, for example, software (e.g., a program 1240) to control at least one other component (e.g., a hardware or a software component) of the electronic device 1201 coupled with the processor 1220, and may perform various data processing or computations. As at least part of the data processing or computations, the processor 1220 may load a command or data received from another component (e.g., the sensor module 1276 or the communication module 1290) in volatile memory 1232, process the command or the data stored in the volatile memory 1232, and store resulting data in non-volatile memory 1234. The processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that may be operable independently from, or in conjunction with, the main processor 1221. Additionally or alternatively, the auxiliary processor 1223 may be adapted to consume less power than the main processor 1221, or execute a particular function. The auxiliary processor 1223 may be implemented as being separate from, or a part of, the main processor 1221.

The auxiliary processor 1223 may control at least some of the functions or states related to at least one component (e.g., the display device 1260, the sensor module 1276, or the communication module 1290) among the components of the electronic device 1201, instead of the main processor 1221 while the main processor 1221 may be in an inactive (e.g., sleep) state, or together with the main processor 1221 while the main processor 1221 may be in an active state (e.g., executing an application). According to one embodiment, the auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by other component (e.g., the processor 1220) of the electronic device 1201, from the outside (e.g., a user) of the electronic device 1201. The input device 1250 may include, for example, a microphone, a mouse, or a keyboard.

The sound output device 1255 may output sound signals to the outside of the electronic device 1201. The sound output device 1255 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. According to one embodiment, the display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. According to one embodiment, the audio module 1270 may obtain the sound via the input device 1250, or output the sound via the sound output device 1255 or a headphone of an external electronic device 1202 directly (e.g., wired) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. The sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device 1202 directly (e.g., wired) or wirelessly. According to one embodiment, the interface 1277 may include, for example, a high definition multimedia interface (HDMI), a universal serial bus (USB) interface, a secure digital (SD) card interface, or an audio interface.

A connecting terminal 1278 may include a connector via which the electronic device 1201 may be physically connected with the external electronic device 1202. According to one embodiment, the connecting terminal 1278 may include, for example, an HDMI connector, a USB connector, an SD card connector, or an audio connector (e.g., a headphone connector).

The haptic module 1279 may convert an electrical signal into a mechanical stimulus (e.g., a vibration or a movement) or an electrical stimulus that may be recognized by a user via tactile sensation or kinesthetic sensation. According to one embodiment, the haptic module 1279 may include, for example, a motor, a piezoelectric element, or an electrical stimulator.

The camera module 1280 may capture a still image or moving images. According to one embodiment, the camera module 1280 may include one or more lenses, image sensors, image signal processors, or flashes.

The power management module 1288 may manage power supplied to the electronic device 1201. The power management module 1288 may be implemented as at least part of, for example, a power management integrated circuit (PMIC).

The battery 1289 may supply power to at least one component of the electronic device 1201. According to one embodiment, the battery 1289 may include, for example, a primary cell that may be not rechargeable, a secondary cell that may be rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the AP) and supports a direct (e.g., wired) communication or a wireless communication. According to one embodiment, the communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as BLUETOOTH TM, wireless-fidelity (Wi-Fi) direct, or a standard of the Infrared Data Association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. According to one embodiment, the antenna module 1297 may include one or more antennas, and, therefrom, at least one antenna appropriate for a communication scheme used in the communication network, such as the first network 1298 or the second network 1299, may be selected, for example, by the communication module 1290 (e.g., the wireless communication module 1292). The signal or the power may then be transmitted or received between the communication module 1290 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. All or some of operations to be executed at the electronic device 1201 may be executed at one or more of the external electronic devices 1202, 1204, or server 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

One embodiment may be implemented as software (e.g., the program 1240) including one or more instructions that are stored in a storage medium (e.g., internal memory 1236 or external memory 1238) that may be readable by a machine (e.g., the electronic device 1201). For example, a processor of the electronic device 1201 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium may be a tangible device, and does not include a signal (e.g., an electromagnetic wave), but this term does not differentiate between where data may be semi-permanently stored in the storage medium and where the data may be temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PLAY STORE TM), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are examples only. One skilled in the art may recognize various alternative embodiments from those specifically disclosed. Those alternative embodiments are also intended to be within the scope of this disclosure. As such, the embodiments are limited only by the following claims and their equivalents.

What is claimed is:

1. A method comprising:
   generating a receive timing error group (Rx TEG) based on a time delay of a receive (Rx) signal, wherein the time delay is a time measured from an arrival of the Rx signal at a Rx antenna to a time of the Rx signal being digitized and time-stamped at a baseband processor of a user equipment (UE);
   determining a timing error group (TEG) index corresponding to the generated Rx TEG;
   determining a positioning measurement associated with the Rx antenna used to generate the Rx TEG; and
   reporting the positioning measurement associated with the Rx TEG index.

2. The method of claim 1, wherein the Rx TEG is further based on one or more reported UE capabilities.

3. The method of claim 1, wherein the positioning measurement comprises a reference signal time difference (RSTD) measurement.

4. The method of claim 3, wherein the RSTD measurement is based on a position reference signal (PRS) resource associated with the Rx TEG.

5. The method of claim 3, wherein the RSTD measurement comprises a plurality of RSTD measurements based on a PRS resource of a transmission and reception point (TRP) with another Rx TEG corresponding to a different UE.

6. The method of claim 1, further comprising pre-calibrating the time delay and compensating for the time delay based on the pre-calibrating.

7. The method of claim 1, further comprising receiving a request from a Location Measurement Function (LMF) to report the Rx TEG index.

8. The method of claim 1, wherein the UE is configured to operate as a UE-assisted positioning device, and
   wherein the reporting the positioning measurement comprises reporting to an LMF at a location server.

9. The method of claim 1,
wherein the UE is configured to operate as a UE-based positioning device, and
wherein the reporting the positioning measurement associated with the Rx TEG index comprises reporting to the UE.

10. A method comprising:
generating a transmit timing error group (Tx TEG) based on a time delay of a transmit (Tx) signal, wherein the time delay is a time measured from generation of the Tx signal at a baseband processor to a time of transmission of the Tx signal by a Tx antenna of a user equipment (UE);
determining a timing error group (TEG) index corresponding to the generated Tx TEG;
reporting an association information of sounding reference signal (SRS) resources for positioning with the Tx TEG index; and
transmitting the SRS resources for 5G node B (gNB) measurement.

11. The method of claim 10, wherein the Tx TEG is further based on one or more reported UE capabilities.

12. The method of claim 10, wherein the positioning comprises a relative time of arrival (RTOA) measurement.

13. The method of claim 12, wherein the RTOA measurement is based on a transmission and reception point (TRP) associated with the Tx TEG index.

14. The method of claim 12, further comprising pre-calibrating the time delay and compensating for the time delay based on the pre-calibrating.

15. The method of claim 12, further comprising receiving a request from a corresponding gNB to report the Tx TEG index.

16. The method of claim 12, wherein the reporting the association information of the SRS resources comprises reporting to a Location Measurement Function (LMF) at a location server.

17. A method comprising:
generating a receive and transmit timing error group (RxTx TEG) based on a time delay of a receive and transmit signal, wherein the receive and transmit signal is a time measured from an arrival of a downlink (DL) positioning reference signal (PRS) at a receive (Rx) antenna to a time of an uplink (UL) PRS is transmitted from a transmit (Tx) antenna of a user equipment (UE);
determining a timing error group (TEG) index corresponding to the generated RxTx TEG;
determining a positioning measurement from the Rx antenna and the Tx antenna; and
reporting the positioning measurement associated with the RxTx TEG index.

18. The method of claim 17, wherein the RxTx TEG is further based on one or more reported UE capabilities.

19. The method of claim 17, wherein the positioning measurement comprises a UE Rx-Tx time difference.

20. The method of claim 19, wherein the UE Rx-Tx time difference measurement is based on a pair of PRS and SRS resources associated with the RxTx TEG.

21. The method of claim 17, further comprising pre-calibrating the time delay and compensating for the time delay based on the pre-calibrating.

22. The method of claim 17, further comprising receiving a request from the Location Management Function (LMF) to report the RxTx TEG index.

23. The method of claim 17, wherein the reporting the positioning measurement comprises reporting to an LMF at a location server.

* * * * *